United States Patent [19]

Jürgens et al.

[11] Patent Number: 4,759,432
[45] Date of Patent: Jul. 26, 1988

[54] PRESSURE MEDIUM-ADJUSTING MEMBER FOR THE ACTUATION OF A LAMELAE-CLUTCH WITH A LUBRICATING VALVE

[75] Inventors: Gunter Jürgens, Waiblingen; Heinrich Straub, Stuttgart, both of Fed. Rep. of Germany

[73] Assignee: Daimler-Benz Aktiengesellschaft, Stuttgart, Fed. Rep. of Germany

[21] Appl. No.: 33,354

[22] Filed: Apr. 2, 1987

[30] Foreign Application Priority Data

Apr. 2, 1986 [DE] Fed. Rep. of Germany ....... 3611003

[51] Int. Cl.⁴ ...................... F16D 25/063; F16D 13/72
[52] U.S. Cl. ............... 192/85 AA; 192/106 F; 192/113 B
[58] Field of Search ............. 192/70.12, 106 F, 113 B, 192/85 AA

[56] References Cited

U.S. PATENT DOCUMENTS

| | | | |
|---|---|---|---|
| 2,939,558 | 6/1960 | Schjolin | 192/106 F X |
| 3,105,582 | 10/1963 | Zrabicki | 192/113 B |
| 3,834,503 | 9/1974 | Maurer et al. | 192/87.17 X |
| 4,134,483 | 1/1979 | Horsch | 192/113 B |

FOREIGN PATENT DOCUMENTS

| | | |
|---|---|---|
| 2802676 | 8/1979 | Fed. Rep. of Germany . |
| 3220746 | 12/1983 | Fed. Rep. of Germany . |
| 3444103 | 6/1986 | Fed. Rep. of Germany . |
| 1303654 | 8/1962 | France .......................... 192/85 AA |
| 80586 | 4/1963 | France .......................... 192/106 F |

Primary Examiner—Rodney H. Bonck
Attorney, Agent, or Firm—Barnes & Thornburg

[57] ABSTRACT

In a pressure medium adjusting element for actuating a disk clutch; a cylinder is fixedly mounted to a disk carrier and with a shaft segment portion provided with a radial shaft bore for supplying lubricating oil for the clutch; wherein an axial piston operating in the cylinder is connected with a lubricating valve to release a stream of lubricating oil from a large oil retaining baffle chamber, connected with the radial shaft bore, to the disk stack, when the clutch is engaged; and wherein the piston abuts the shaft segment portion and is biased by return springs; and wherein the lubricating valve being structurally disposed in a wall of the baffle and operably connected between the baffle chamber and the clutch chamber containing the disk stack.

3 Claims, 1 Drawing Sheet

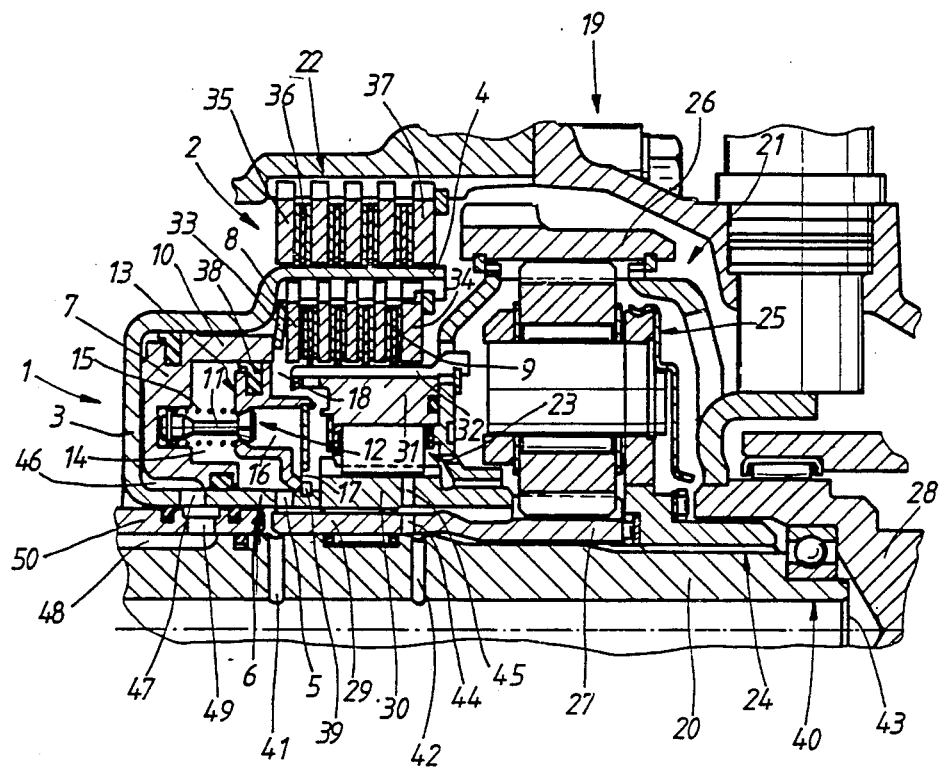

PRESSURE MEDIUM-ADJUSTING MEMBER FOR THE ACTUATION OF A LAMELAE-CLUTCH WITH A LUBRICATING VALVE

BACKGROUND AND SUMMARY OF THE INVENTION

The invention relates to a pressure medium adjusting element with a lubricating valve. In a known pressure medium adjusting element of this type (German OS No. 28 02 676) an axial piston is designed in one piece with an annular pusher, concentric with respect to the shaft segment; said pusher cooperating directly with a radial shaft bore, when the clutch in its released position, to allow a throttled flow of lubricant to reach the disk stack and by increasing the flow by increasing the throttle cross section of the radial shaft bore when the clutch is in its engaged position.

In this known arrangement, relatively high torque losses occur when the clutch is released, due to the oil shearing forces prevailing at the disks as a result of the flow of lubricant. However, the volume of lubricant available per unit of time, when the clutch is engaged, is limited by the design characteristics of the shaft segment, so that when the clutch is engaged an increase in the amount of heat in clutch stack occurs which cannot be taken sufficiently into account.

German OS No. 32 20 746 teaches a lubricating device of a different species for a manual gear shift transmission, wherein a metering piston is held in one stroke end position by a spring force and is actuatable into its other stroke end position by an auxiliary force which are generated when shifting the transmission, to thereby press a volume of lubricant, drawn up into a spring chamber from an oil sump, through a first check valve into a second check valve and hence into a lubricating line which leads to the clutch and synchronizer units of the individual gears. In this lubricating device, high losses are caused by liquid friction and are unavoidable, because each time the gears are shifted, all the clutch and synchronizing components which are not involved are given lubricant.

An object of this invention consists in keeping the losses caused by oil shearing forces low when the clutch is released, by a pressure medium adjusting element with a lubricating valve for actuating a disk clutch, and supplying a sufficiently large quantity of lubricant to handle the increased amount of heat produced when the clutch is engaged.

On the basis of a pressure medium adjusting element with a lubricating valve wherein a piston is located in a cylinder for activating a set of clutch disks and wherein the piston controls a flow of fluid from a radial shaft segment, located internally of the cylinder and piston, to the stack of clutch disks by means of a lubricating valve controlling flow of lubricating oil from a shaft bore in the shaft segment, the object is achieved in an advantageous manner by locating a large pressure tight baffle chamber between the piston and the clutch disk and having the piston control flow of lubricating oil from a radial port in the shaft segment through the baffle chamber by having the piston activate a lubricating valve to control the flow of oil from the baffle chamber. The invention also includes a bias spring for the piston located concentrically with the valve. Additionally, the invention includes a equalizing chamber located between the valve outlet of the baffle chamber and the clutch disks.

The invention provides the following advantages:

The lubricant which is stored in the large baffle chamber and the equalizing chamber, when the clutch is released, is additionally available for carrying away heat when the clutch is engaged.

When the clutch is released, the flow of lubricant to the clutch disk stack through the lubricating valve is completely cut off so that the shear friction losses are negligible. This is important for the use of a planetary gear set which operates as an overdrive, wherein, when the disk clutch is released, the takeoff-side driving element is speeded up and the transmission element connected to the other half of the clutch is firmly braked, so that the mutual relative rpm of the two clutch halves is especially great. In addition, the frequency of shifting into a gear designed as an overdrive and the next direct gear is high and therefore it is especially necessary for heat to be carried away from the disk stack.

With the clutch engaged, by virtue of the volume of lubricant captured in the baffle chamber and equalizer chamber, equalization of centrifugal force is accomplished with respect to the volume of hydraulic oil stored in the working pressure chamber to energize the axial piston.

Cutting off the flow of lubricant to the disk stack permits an increased flow of lubricant to the tooth engagement points of the corresponding planetary gear set. When the planetary gear set operates with a free-running clutch to make shifting easier, an increased flow of lubricant to improve the lubrication of the free-running clutch is obtained.

A separate closing spring for the lubricating valve is rendered unnecessary by using the return spring on the axial position.

The lubricating valve operates as a seat valve and therefore, even after a small piston travel of the axial piston, supplies a sufficient flow of lubricant to the disk stack when the clutch is engaged.

These and other objects, features, and advantages of the present invention will become more apparent from the following description when taken in connection with the accompanying drawing which show, for the purposes of illustration only, one embodiment in accordance with the present invention, and wherein:

BRIEF DESCRIPTION OF THE DRAWINGS

The only FIG. provides a schematic showing of the clutch mechanism of the invention.

DETAILED DESCRIPTION OF THE DRAWINGS

The FIG. shows a transmission housing 19 of an automatic transmission, having a central intermediate shaft 20 which is drivable in a usual manner (not shown in greater detail) by a driving engine, possibly with interposition of at least one planetary gear set, and a transmission takeoff shaft 28, which communicates in the usual manner for providing the axle drive for a vehicle axle.

In addition, in transmission housing 19 there is a pressure medium adjusting element 1 and a concentric arrangement, connected axially thereto, composed of a radially outwardly located disk brake 22, a radially inwardly located free-running clutch 23, and a disk clutch 2 located between them. Axially, next to this three-member arrangement, is a planetary gear set 21 which has a planet carrier 25, supporting planet gears, rotatably mounted thereon and with the planet carrier being nonrotatably connected with intermediate shaft 20 via a spline tooth 24, and a central gear 26 which is external and nonrotatably connected with transmission takeoff shaft 28, as well as inner central gear 27, which is made in one piece with a hollow shaft 29, rotatably mounted on intermediate shaft 20 and with the planet gears meshing with both central gears.

While hollow shaft 29 is nonrotatably connected with inner ring 30 of free-running clutch 23, its outer ring 31 has a nonrotatable connection to an inner disk carrier 32 of disk clutch 2 as well as outer central gear 26. Inner disks 9 are nonrotatably mounted on inner disk carrier 32 and are axially displaceable to engage outer disks 8, which are nonrotatably and axially displaceable mounted on an outer disk carrier 4.

Disk stack 8, 9 is actuatable via a cup spring 33 by a pressure ring 10, said ring being made integral with an axial piston 7, axially displaceable in cylinder 3. Disk stack 8, 9 abuts a safety ring mounted in a circumferential groove in the outer disk carrier 4 by means of a counterbearing plate 34.

Inner disks 36 of brake 22, are mounted axially displaceable but nonrotatably on the outer circumference of disk carrier 4 and cooperate with outer disks 35. The outer disks are nonrotatably and axially displaceable and engage axial grooves in transmission housing 19. The entire disk package 35, 36 is supportable against a counterbearing plate 37 under the influence of the usual actuating piston (not shown in greater detail), with said plate 37 in turn abutting transmission housing 19 through a safety ring.

Cylinder 3 is made integral with a radial inner hollow shaft portion 6, which is nonrotatably connected with hollow shaft 29 by a spline tooth. The shaft portion 6 has a radial shaft bore, 5 for the lubricating oil supply, which shaft bore 5 terminates in a baffle chamber 14. Baffle chamber 14 is itself enclosed between the end of axial piston 7 which faces disk stack 8, 9 and a baffle 13, by means of an annular seal 38, while baffle 13 is held with respect to shaft portion 6 by means of a safety ring 39.

Axial piston 7 supported by cylinder shaft portion 6 is biased away from the disk stack 8, 9 by return springs 15 (only one of which is shown) acting on baffle 13. One of the return springs 15 is disposed concentrically with respect to a valve closing element 11, at its connection with axial piston 7, of a lubricating valve 12. Said closing element in turn is connected with a lubricating valve 12, which valve is structurally disposed in baffle 13 and effectively located between baffle chamber 14 and clutch chamber 18 containing disk stack 8, 9.

An equalizing chamber 16, is provided between baffle 13 and clutch chamber 18, said equalizing chamber 16 being closed to said baffle chamber 14 by said lubricating valve 12, but having, at a point which is internal and radial with respect to lubricating valve 12, an open connection 17 with clutch chamber 18. When rotation of ring gear 30 occurs and valve 12 is open fluid flows from equalizing chamber 16 through opening 17 to disk packs 8 and 9.

Central intermediate shaft 20 is provided with a centrally located axial lubricating channel 40 which is fed by the lubricant supply of the transmission (not shown) with lubricant and through a radial shaft bore 41 and shaft bore 5 of the shaft portion 6 of cylinder 3 is connected with baffle chamber 14; and by a radial shaft bore 42, radial bore 44 in hollow shaft 29, and a radial bore 45 of inner ring 30, is connected with free-running clutch 23. Lubricant channel 40 is also open to the shaft end of central intermediate shaft 20 which is adjacent to the transmission takeoff shaft 28 and is connected to provide a flow connection opening 43 and axial lubricant passageways between shafts 20 and 28 with the teeth of planetary gear set 21.

Axial piston 7 together with cylinder 3 enclose a working pressure chamber 46 into which a radial bore 47 of cylinder 3 terminates. Bore 47 communicates with a pressure channel 48 of central intermediate shaft 20 through a radial bore 49 in a sleeve 50 which is unmovably held in transmission housing 19.

When the transmission is shifted into overdrive, disk clutch 2 is in the released state shown, while cylinder 3 together with inner ring gear 30 and inner central gear 27 are braked by engagement of disk brake 22. As a result, outer central gear 26 together with takeoff shaft 28 are accelerated so that the relative rpms of rotating outer ring 31 relative to fixed inner ring 30 and of rotating inner disks 9 relative to fixed outer disks 8 are all very great. Under these conditions lubricating valve 12 is closed, however, so that a quantity of lubricant is stored in baffle chamber 14. Equalizing chamber 16 is thus kept substantially full with the fluid therein and will not allow for passage of fluid to the disk stack 8, 9 due to the lack of any open fluid inlet and no rotational movement of the cylinder 3 and the stationary nature of ring gear 30.

By cutting off the flow of lubricant in radial shaft bore 41 by means of lubricating valve 12, a larger volume of lubricant per unit time is available for free-running clutch 23 through radial shaft bore 42 and for the teeth of planetary gear set 21 through the endwise opening 43 of lubricating channel 40.

If the transmission is shifted into reverse gear, so that disk brake 22 is released and disk clutch 2 is engaged; lubricating valve 12, designed as a seat valve, exposes a relatively large valve cross section for flow to disk stack 8, 9 following a small amount of travel of axial piston 7, so that the increase in the amount of heat is kept within limits. Baffle chamber 14 and equalizing chamber 16 considerably increase the total volume of lubricant which is available when disk clutch 2 is engaged.

With disk clutch 2 engaged, the amount of lubricant trapped in baffle chamber 14 and equalizing chamber 16 effected by centrifugal force, as well as by the centrifugal force effects on axial piston 7, provide equilibrium with the centrifugal force effects of the quantity of lubricant fed into working pressure chamber 46 through pressure channel 48. The inward location of connection 17 permits a centrifugal force to be applied to the oil in the equalizing chamber and thus contributes to a smaller radius of the clutch axis than would occur with only a baffle chamber with its centrifugal oil force and lubricating valve 12.

While we have shown and described only one embodiment in accordance with the present invention, it is understood that the same is not limited thereto but is susceptible to numerous change and modifications as known to one having ordinary skill in the art, and we therefore do not wish to be limited to the details shown and described herein, but intend to cover all such modifications as are encompassed by the scope of the appended claims.

What is claimed is:

1. A pressure medium adjusting means for operating a disk clutch, comprising: a disk clutch having a plurality of stacked clutch disks, some of which are connected to a clutch disk carrier, a cylinder fixedly connected to the disk carrier of the clutch and having a shaft segment portion which has at least one radial shaft bore for a lubricating oil supply for the disk clutch, said cylinder containing an axially movable piston means, said piston means having a pressure ring portion cooperating with the stacked clutch disks as well as with a lubricating valve controlling means, which lubricating valve controlling means, when the clutch is engaged, causes a release of lubricating oil from the radial shaft bore to the stacked disk clutch and, when the clutch is released causes little or no flow to the stacked disk clutch and wherein the axial piston pressure ring portion faces the stacked disks, a radial baffle means secured to the shaft segment portion for defining a pressure tight baffle chamber between the piston means and the shaft segment portion, the radial shaft bore opening into the baffle chamber, the axial piston means being biased by at least one return spring, said lubricating valve controlling means being disposed in said radial baffle means, and wherein at least one return spring is disposed concentrically about said lubrication valve controlling means and abuts the axially movable piston means through the valve controlling means.

2. A pressure medium adjusting element according to claim 1, wherein an equalizing chamber is connected to the baffle chamber by said lubricating valve controlling means and also communicates, at an inner point which is located radially with respect to lubricating controlling means valve, in an open connection with a clutch chamber containing the stacked disks.

3. A pressure medium adjusting means for operating a disk clutch, comprising: a disk clutch having a plurality of stacked clutch disks, some of which are connected to a clutch disk carrier, a cylinder fixedly connected to the disk carrier of the clutch and having a shaft segment portion which has at least one radial shaft bore for a lubricating oil supply for the disk clutch, said cylinder containing an axially movable piston means, said piston means having a pressure ring portion cooperating with the stacked clutch disks as well as with a lubricating valve controlling means, which lubricating valve controlling means, when the clutch is engaged, causes a release of lubricating oil from the radial shaft bore to the stacked disk clutch and, when the clutch is released causes little or no flow to the stacked disk clutch and wherein the axial piston pressure ring portion faces the stacked disks, a radial baffle means secured to the shaft segment portion for defining a pressure tight baffle chamber between the piston means and the shaft segment portion, the radial shaft bore opening into the baffle chamber, the axial piston means being biased by at least one return spring, said lubricating valve controlling means being disposed in said radial baffle means, and wherein an equalizing chamber is connected to the baffle chamber by said lubricating valve controlling means and also communicates, at an inner point which is located radially with respect to lubricating controlling means valve, in an open connection with a clutch chamber containing the stacked disks.

* * * * *